US008025560B2

(12) United States Patent
Ikejiri et al.

(10) Patent No.: US 8,025,560 B2
(45) Date of Patent: Sep. 27, 2011

(54) GAME CONTROL PROGRAM, GAME CONTROL METHOD, AND GAME DEVICE

(75) Inventors: Daisaku Ikejiri, Tokyo (JP); Masashi Muramori, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 288 days.

(21) Appl. No.: 11/912,740

(22) PCT Filed: Sep. 25, 2006

(86) PCT No.: PCT/JP2006/318989
§ 371 (c)(1),
(2), (4) Date: Dec. 17, 2008

(87) PCT Pub. No.: WO2007/105332
PCT Pub. Date: Sep. 20, 2007

(65) Prior Publication Data
US 2009/0280903 A1    Nov. 12, 2009

(30) Foreign Application Priority Data
Mar. 14, 2006    (JP) ................................ 2006-069853

(51) Int. Cl.
*A63F 13/00* (2006.01)
(52) U.S. Cl. ..................................... 463/2; 463/1; 463/3
(58) Field of Classification Search .................... 463/38, 463/1–5, 40–42
See application file for complete search history.

(56) References Cited

U.S. PATENT DOCUMENTS

| 6,461,237 | B1 * | 10/2002 | Yoshinobu et al. | 463/3 |
|---|---|---|---|---|
| 6,478,678 | B1 * | 11/2002 | Rimoto et al. | 463/31 |
| 6,482,086 | B1 * | 11/2002 | Rimoto et al. | 463/1 |
| 6,482,090 | B1 * | 11/2002 | Rimoto et al. | 463/31 |
| 6,767,282 | B2 * | 7/2004 | Matsuyama et al. | 463/3 |
| 7,297,056 | B2 * | 11/2007 | Takahashi et al. | 463/3 |
| 2003/0078086 | A1 * | 4/2003 | Matsuyama et al. | 463/3 |
| 2004/0214623 | A1 * | 10/2004 | Takahashi et al. | 463/2 |

FOREIGN PATENT DOCUMENTS
JP    7-112072    5/1995

OTHER PUBLICATIONS

International Search Report dated Dec. 19, 2006, from thecorresponding International Application.
Tennis no Ojisama Smash Hit! 2, Shueisha Inc., Dec. 23, 2003, pp. 12, 14.
Notification of Reason(s) for Refusal dated Jun. 22, 2010, from the corresponding Japanese Application.

(Continued)

*Primary Examiner* — Masud Ahmed
(74) *Attorney, Agent, or Firm* — Katten Muchin Rosenman LLP (57) ABSTRACT

A game apparatus controls a game in which a user-controlled character and an opponent character hit a ball. When the user gives an instruction for hitting the ball with a button of a controller, a hit control unit determines on the basis of the type of the button which is pressed by the user a shot when the character hits the ball, calculates the trajectory of the ball hit based on the shot, and displays the flying ball on a screen. A shot display control unit displays the figure marked on the button close to the ball on the screen, as information for specifying the shot.

3 Claims, 7 Drawing Sheets

OTHER PUBLICATIONS

V Jump Books [game series], The Prince of Tennis Smash Hit! 2, Shueisha Inc., Dec. 23, 2003, p. 12, 14-15.

Mario Tennis Advance Complete Guidebook, Enterbrain, Inc., Nov. 3, 2005, first edition, p. 14.

International Preliminary Report on Patentability and the Written Opinion of the International Searching Authority dated Sep. 16, 2008, from the corresponding International Application.

Decision of Refusal dated Mar. 8, 2011, from corresponding Japanese Application No. 2006-069853.

* cited by examiner

GAME CONTROL PROGRAM, GAME CONTROL METHOD, AND GAME DEVICE

TECHNICAL FIELD

The present invention relates to game control technologies, and in particular to a game control program, game control method, and game apparatus that control a game in which a user-controlled character and an opponent character hit a ball.

BACKGROUND TECHNOLOGY

Many video ball games such as tennis, baseball, and soccer are currently on the market. In particular, the video games which allow the user to experience a simulated high-level competition, by controlling a character which simulates a real pro athlete, have become popular.

DISCLOSURE OF INVENTION

However, seeking to achieve highly realistic matches using a character which simulates a popular pro athlete results in high-level competition beyond the level of a general amateur competition. Such highly realistic matches allow the user to enjoy a simulated high-level match but frequently require significant operational agility to win the match. Specifically, following the ball is often all that novices can do and they may have no time for controlling their characters according to a strategy.

In view of such antithesis to the video game, the inventors made a technology for realizing a video game which allows a range of users to easily enjoy it and which has elements that provide the intrinsic enjoyment of a ball game, such as strategy and game skill, as important factors.

The present invention has been made in view of the aforementioned circumstances and a general purpose thereof is to provide a technology for realizing a broadly entertaining video game.

In order to solve the above problems, a game control program product according to one embodiment of the present invention is a program product that controls a game in which a user-controlled character and an opponent character hit a ball, comprising: a module for determining a shot type when the character hits the ball; a module for calculating the trajectory of the ball hit based on the shot type and displaying the flying ball on a screen; and a module for displaying information for specifying the shot type on the screen.

It should be appreciated that any combinations of the foregoing components, and any conversions of expressions of the present invention between methods, apparatuses, systems, and the like are also intended to constitute applicable embodiments of the present invention.

Effects of the Invention

The present invention makes it possible to provide a technology for realizing a broadly entertaining video game.

DESCRIPTION OF REFERENCE NUMERALS

10 Game apparatus, 20 Controller, 21 Direction keys, 22 Circle button, 23 Cross button, 24 Square button, 25 Triangle button, 26 Hit button, 30 Input unit, 40 Control unit, 41 Move control unit, 42 Hit control unit, 43 AI control unit, 44 Height display control unit, 45 Shot display control unit, 46 Serve control unit, 47 Power control unit, 60 Parameter storage unit, 66 Image processing unit, 68 Display device

THE BEST MODE FOR CARRYING OUT THE INVENTION

A game apparatus according to one embodiment provides a video game in which a character controlled by a user and an opponent character controlled by another user or by a computer play a ball game in which they hit a ball, such as tennis, table tennis, badminton, or volleyball. Tennis is given here as an example by which the embodiment can be described.

In the field of sports video games, the major games allow the user to enjoy a simulated high-level competition using a character simulating a real professional or famous athlete. Many tennis games also require significant operational agility to win because of quick ball movement. In such tennis games, following the ball is often all that novices can do and they may have no time for strategy such as, for example, selecting the proper shot type and ball speed or aiming at a target on the court depending on the situation. In this way, video games simulating professional competitions and the like have a high difficulty level, and thus have the problem of being hard for the user to play. Also, since some shift of the position of a character or the timing of stroke is forcibly corrected to allow the user to hit the ball with simple stroke operation, the user has a little sense of self-operation.

By contrast, the tennis game according to the present embodiment provides a tennis game which simulates a novice or amateur match by slowing down the movement of the ball to allow the user who is not good at responding quickly to enjoy it. The slow ball allows the user to plan operations such as the shot and the timing of stroke for each ball approach, thereby providing a highly strategic game. Further, the tennis game according to the present embodiment does not simply decrease the difficulty level of the game. The ball is slow but is not returned in the target direction unless the ball is hit at the proper position and with the proper timing. In this way, a video game is provided which breaks away from the conventional view of video games of competition on the reflex nerve, and which can provide an intrinsically more interesting game of tennis with competition on the basis of game skill such as the direction chosen for returning the ball and the quality of the shot.

Figure 1:
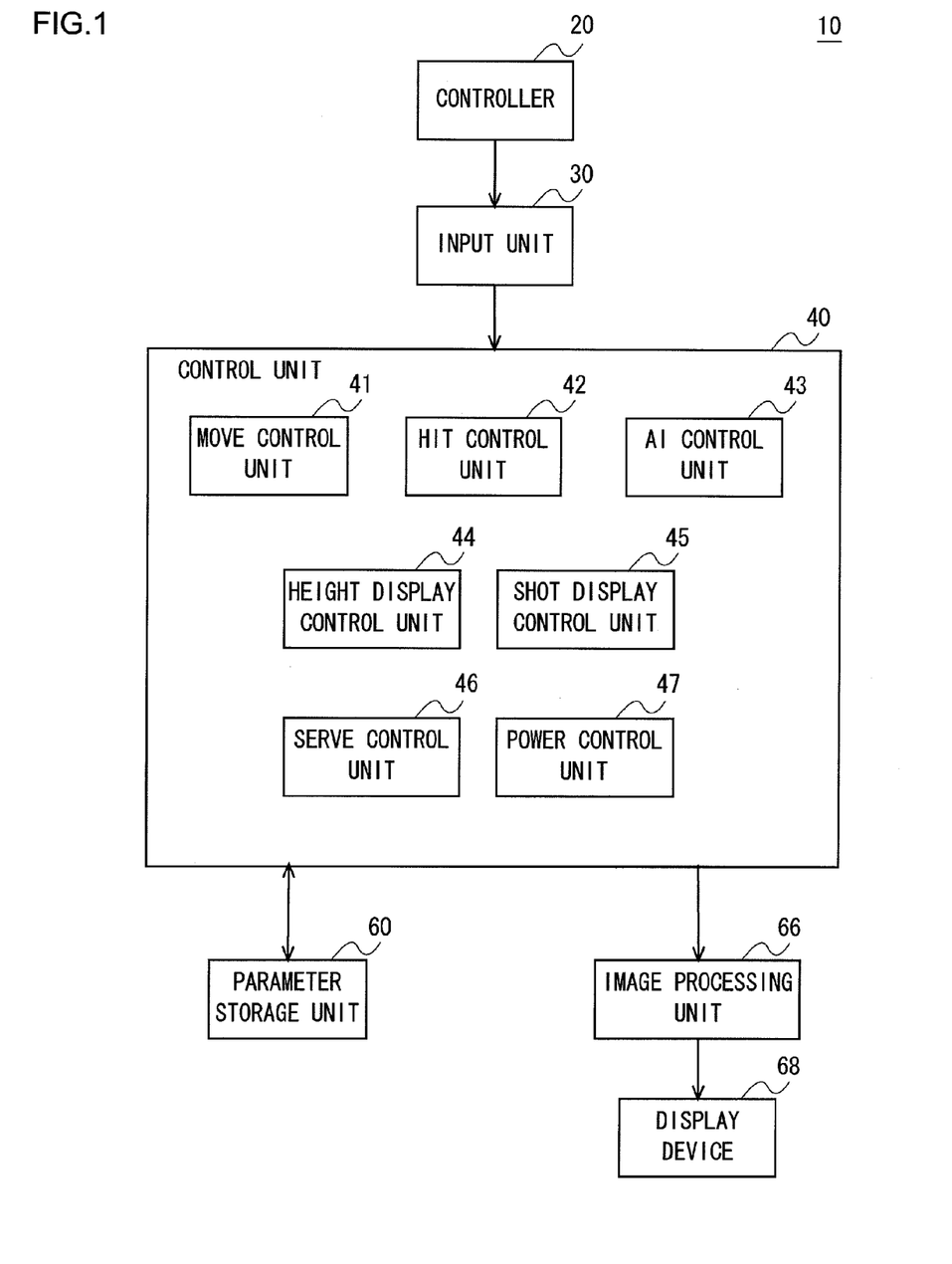
FIG. 1 is a diagram showing a configuration of a game apparatus according to an embodiment.

FIG. 1 shows a configuration of a game apparatus 10 according to the embodiment. The game apparatus 10 includes a controller 20, an input unit 30, a control unit 40, a parameter storage unit 60, an image processing unit 66, and a display device 68. These components can be provided as hardware such as a CPU, a memory, and a program loaded in the memory of a computer, but the functional blocks that are realized by the cooperation between hardware components are shown herein. Accordingly, those skilled in the art will recognize that these functional blocks can be implemented in various configurations with hardware-only, software-only, or combinations of hardware and software.

The input unit 30 receives a control signal input through the controller 20, which is operated by the user. The control unit 40 executes game programs following user's instructions received by the input unit 30, and performs the tennis game while controlling the action of the character which serves as a tennis player in the game world. The parameter storage unit 60 stores parameters for determining athletic abilities, including movement speed, physical strength, power, stamina, degree of fatigue, controllability, spin, variations in shot (accuracy), ball power, and ball speed, as well as the name, type, and level of the character. The image processing unit 66 creates a game screen which is controlled by the control unit 40 and displays it on the display device 68.

Figure 2:
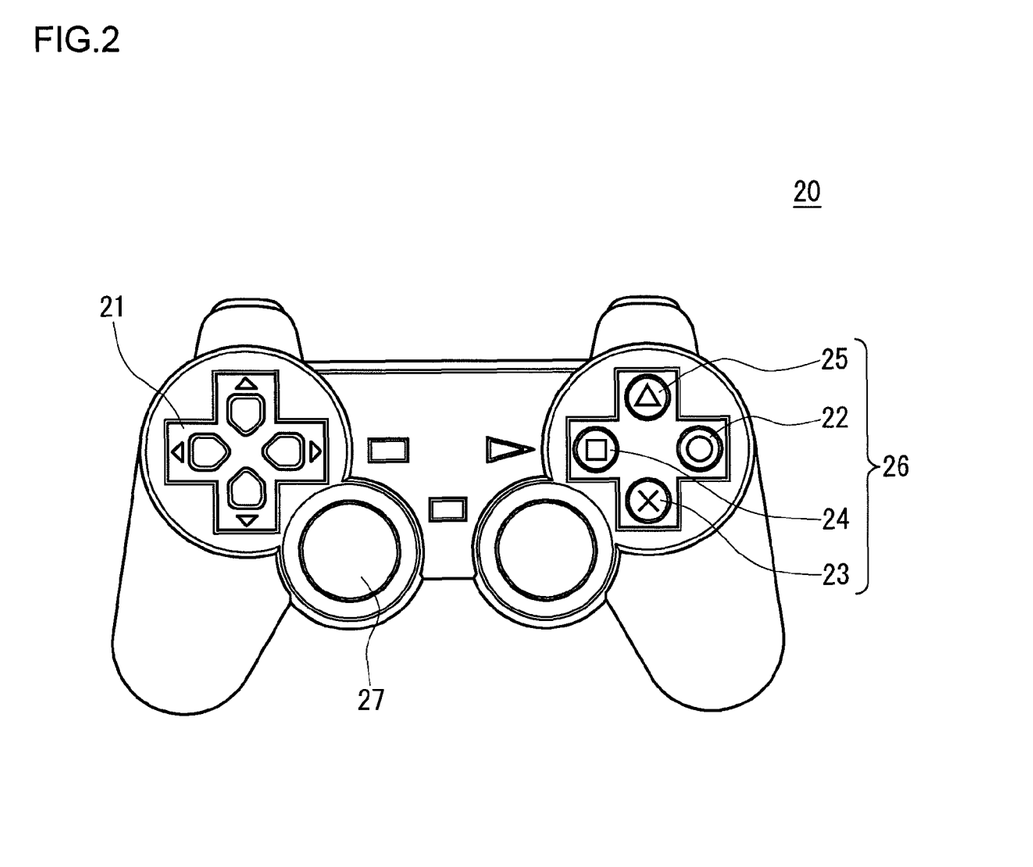
FIG. 2 shows an appearance of a controller.

FIG. 2 shows an appearance of the controller. The controller 20 is provided with direction keys 21, analog sticks 27, and four buttons 22, 23, 24, and 25. The four buttons 22 to 25 are marked with predetermined colors and predetermined figures to distinguish them from each other. Specifically, the circle button 22 is marked with a red circle, the cross button 23 is marked with a blue cross, the square button 24 is marked with a purple square, and the triangle button 25 is marked with a green triangle. In the video game according to the embodiment, the direction keys 21 or analog sticks 21 are mainly used to give instructions for the direction of movement of the character and the shot direction, and the four buttons 22 to 25 are used to hit the ball with a racket. The four buttons 22 to 25 are hereinafter collectively referred to as a "hit button 26."

Returning to FIG. 1, the explanation of each component will be continued. The parameter storage unit 60 stores in advance parameters for controlling the action for multiple characters. When the type of the character to be controlled by the user and the type of the opponent character are selected at the start of the game, the control unit 40 reads out the parameters for the selected characters from the parameter storage unit 60.

Parameters emphasizing the personality of each character may be set. For example, characters for novices and characters for the experienced may be prepared. In this case, the characters for novices may be set in such a manner that a shift in the position and timing of hitting the ball shifts the direction of flight only a little off the target point but the physical strength and athletic ability of the character are low. On the other hand, characters for experienced players may be set in such a manner that the physical strength and athletic ability are high but a shift in the position and timing of hitting the ball shifts the direction of flight a large distance off the target point, and thus highly accurate positioning and timing of the shot is required.

The move control unit 41 controls the movement of the character. When the user gives instructions for the direction of movement of the character with the direction keys 21 or analog sticks 27, the move control unit 41 moves the character in the direction specified by the user. The move control unit 41 moves the character away from the user on the screen when the user presses the up key, moves the character toward the user on the screen when the user presses the down key, moves the character to the right on the screen when the user presses the right key, and moves the character to the left on the screen when the user presses the left key. The same is true for the analog sticks 27. When the user operates the directions keys 21 or analog sticks 27 while pressing a hit button 26—any one of the circle button 22, cross button 23, square button 24, and triangle button 25—the direction of flight of the ball (or the target point toward which the ball is directed) is identified as being specified and thus the character is not moved.

The move control unit 41 calculates the movement speed of the character on the basis of parameters indicating the athletic ability of the character, and calculates a moving distance of the character depending on the input time of the direction keys 21 or analog sticks 27. The move control unit 41 may calculate the degree of fatigue felt by the character on the basis of parameters indicating the physical strength of the character, and may decrease the movement speed of the character when the character is tired. For example, the game may be controlled so that continuous movement for a long time during a long rally causes the degree of fatigue felt by the character to become high and causes the character's movement speed to become low. High degree of fatigue may have an effect such that the allowable range of the racket is decreased, the power of the ball is decreased, and the variations in the direction of actual flight relative to the target point are increased. As a result, an undesirably slow game pace resulting from excessively long rallies can be prevented. Since the character can take a rest to recover his/her physical strength before the next play is started after the rally, the degree of fatigue may be reset.

The hit control unit 42 controls the stroke with which the ball is hit by the character and controls the behavior of the hit ball. When the user presses one of the circle button 22, cross button 23, square button 24, and triangle button 25 to give a hit instruction, the hit control unit 42 causes the character to act as if hitting the ball with the racket. At this time, the hit control unit 42 determines whether the stroke is successful, in other words, whether the racket hits the ball. The hit control unit 42 determines whether the racket hits the ball on the basis of the position and height of the ball when the hit button 26 is pressed, and the position of the character. Parameters indicating the possible range of the racket of the character may be referred to.

When the racket hits the ball, the direction of the ball, shot, ball speed, and ball power are each determined and the behavior of the ball is controlled accordingly. The hit control unit 42 first determines the type of shot by acquiring which button is pressed by the user. When the button which has been pressed by the user is the circle button 22, the shot is determined to be a top spin, when the button is the cross button 23, the shot is a slice, when the button is the square button 24, the shot is flat, and when the button is the triangle button 25, the shot is a lob. The target point on the opponent's court is substantially at the center of the opponent's court as a default. When the user presses the direction keys 21 or analog sticks 27 while pressing the hit button 26, the hit control unit 42 acquires the direction corresponding to the pressed button and moves the target point in that direction.

With the direction keys 21, the court is divided into nine sections: three rows by three columns, and the target is moved into one of the sections according to the pressed direction key 21. In other words, the user can select a hit direction from eight directions with respect to the center of the court which is the default target. With the serve described later, the service area is divided into nine sections where the center of the service area is the default target, and thus the user can select a hit direction from eight directions with respect to the center of the service area. With the analog sticks 27, since the target is moved in the direction of incline of the analog sticks 27, the user can select any hit direction from 360-degree directions with respect to the center of the court. A normal shot can be aimed to hit not less than 1 meter inside the lines. However, when the timing of the stroke is correct or when power of at least a predetermined level described later is accumulated, the normal shot can be aimed at a position closer to the line or the net.

The movement of the target may be limited according to the parameters of the character. For example, a parameter which indicates control performance over the stroke may be preset and an allowable range of angles at which the ball can be hit to the right and left may be set depending on this parameter. In this case, the angle of the stroke is calculated from the position of the character and the position of the target specified by the direction keys 21 or analog sticks 27, and if the angle is outside the allowable range of angles, the angle may be adjusted to be within the allowable range by shifting the position of the target.

The allowable range of angles may be changed depending on the ball power, ball speed, the type of shot used in the opponent's stroke, and the type of shot used in the user's stroke. For example, if the ball power of the opponent's stroke is high, the allowable range of angles may be narrowed, and if the ball power of the opponent's stroke is low, the allowable range of angles may be broadened. This can provide the same effects as in real tennis, such as striking the ball differently depending on the ball power of the opponent's stroke. If a flat shot is selected as the type of shot used in the user's stroke, the allowable range of angles may be narrowed.

The hit control unit 42 determines the speed and power of the ball on the basis of the timing of hitting, height of the ball at hitting, position of the character, parameter which indicates the athletic ability of the character, the relationship between shots which indicates a proper return shot with respect to the opponent's shot, and the like, and shifts the actual landing point of the ball from the target accordingly. For example, when the pressing operation of the hit button 26 by the user is late with the character holding the racket in his/her right hand, the landing point is shifted to the right of the target because the face of the racket when the character hits the ball faces to the right of the user's target. Conversely, when the pressing operation is early, the landing point is shifted to the left of the target because the face of the racket faces to the left of the user's target when it hits the ball. Moreover, when the ball is hit in a high position, the landing point is shifted to a position long of the target because the stroke is longer than expected. Conversely, when the ball is hit in a low position, the landing point is shifted to a position short of the target. The amount of shift is determined on the basis of the parameters of the character, the degree of fatigue, a parameter described later which indicates power, and the like. For example, the amount of shift may be set to be larger when the character hits the ball while moving. Moreover, the amount of shift may be set to be larger when, for example, the ball power of the opponent's stroke is high, when the type of shot chosen for the user's stroke is improper with respect to the shot used by the opponent, when the opponent's stroke strongly spins the ball, or when the degree of fatigue felt by the character is high.

The hit control unit 42 shows the quality of timing on the screen when the user presses the hit button 26. For example, when the timing is too early, a rabbit symbol which indicates that the timing is advanced is shown close to the character, when the timing is too late, a tortoise symbol which indicates that the timing is retarded is shown, and when the timing is ideal, a note symbol is shown. The user can adjust the timing of his/her pressing operation by checking the symbol and thus improve his/her operational technique. The hit control unit 42 may change the sound of hitting according to the quality of timing.

The character for the beginner's class, which is set to allow a novice who has not mastered the timing of hitting to play, may be controlled to allow a successful hit to be made even if the timing is incorrect. In this case, even if the user has pressed the hit button 26 too early without waiting for the ball, the hit control unit 42 does not start the hitting process immediately, but rather waits until the timing allows hitting, and then performs the hitting process when the ball comes within an allowable range for hitting. Similarly, in this case, the hit control unit 42 displays a symbol to notify the user that the timing is too early because the ball is hit at the moment when it comes within the allowable range of hitting.

The hit control unit 42 calculates the trajectory of the ball on the basis of the determined shot, ball speed, ball power, and landing point, and displays it on the screen. The trajectory of the ball may be calculated with reference to the parameters of the character as well. For example, a parameter which indicates striking power is preset, and the initial speed of the ball may be determined on the basis of this parameter. Moreover, a parameter which indicates spinning performance is preset, and the degree of fall of the ball, the degree of swerving of the ball, rebound angle and the like may be determined on the basis of this parameter. Moreover, the degree of swerving of the spin ball and the like may be determined on the basis of the ball power. The hit control unit 42 may alter the path of the ball for each shot to exaggerate the feature of the shot. For example, the path of a slice ball may be curved more than a real one. As a result, it is possible to improve strategy for selecting the shot.

When the ball hit by the character lands out of the opponent's court, the control unit 40 increments the points scored by the opponent's character. When the opponent's character does not return the ball after the ball hit by the character lands in the opponent's court, the control unit 40 increments the point scored by the character which has hit the ball. In addition, the points are determined according to the rules of tennis competition.

The AI control unit 43 controls the behavior of any character not operated by the user. For example, if two users play a match in a singles competition, each character is controlled by one of the users' controllers 20, whereas if the user selects a match with the computer, the AI control unit 43 controls the opponent's character. The same is true for the doubles competition. When the user controls one of characters of the same team and the AI control unit 43 controls the other character, the character to be controlled may be switched by a predetermined button pressing operation. In this case, the move control unit 41 and hit control unit 42 control the behavior of the character which is under a user's control, and the AI control unit 43 controls the behavior of the character which is not under the user's control.

The height display control unit 44 controls the presentation of information that indicates the height of the ball on the screen so as to identify it. The height display control unit 44 displays the trajectory of the ball, and changes the display color of the trajectory depending on the height of the ball. The height display control unit 44 first presets the height of the ball which is a reference value for determining whether the ball is high or low. The reference value may be set as the height of the ball which allows the character to hit it most accurately on the basis of parameters such as the height or reach of the character, or may be set as a reference value in common among all characters. When displaying the trajectory of the flying ball, the height display control unit 44 displays the trajectory in red if the height of the ball is higher than the reference value, and displays the trajectory in blue if the height of the ball is lower than the reference value. The height display control unit 44 may set a range of height of the ball which allows the character to hit the ball most accurately, display the trajectory in white if the height of the ball is within the range, display the trajectory in red if the height is higher than the range, and display the trajectory in blue if the height is lower than the range. A predetermined section of the trajectory, in vicinity of the ball only, may be displayed.

Figure 3:
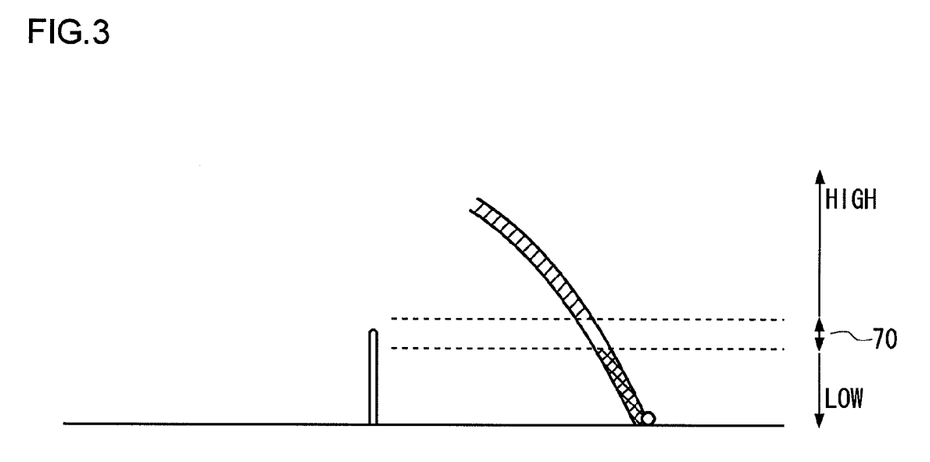
FIG. 3 shows a relationship between height of ball and color of its trajectory.

FIG. 3 shows the relationship between height of the ball and display color of the trajectory. FIG. 3 is a side view of a tennis court. A range 70 which allows the character to hit the ball accurately is set by the height display control unit 44. If the height of the ball is within the range 70, the trajectory is displayed in white, if the height of the ball is higher than the range 70, the trajectory is displayed in red (a diagonal line hatch from top right to bottom left in the drawing), and if the height of the ball is lower than the range 70, the trajectory is displayed in blue (a diagonal lattice hatch in the drawing).

As described above, if the height of the ball is within the range 70 when the character hits the ball, the hit control unit 42 sets the amount of shift in the depth direction of the landing point to zero. If the height of the ball is higher than the range 70 when the character hits the ball, the hit control unit 42 shifts the landing point to a position beyond the target. If the height of the ball is lower than the range 70 when the character hits the ball, the hit control unit 42 shifts the landing point to a position short of the target. If the height of the ball is out of the range which allows the character to hit when the hit button 26 is pressed, the hit control unit 42 identifies the stroke as a miss.

Figure 4:
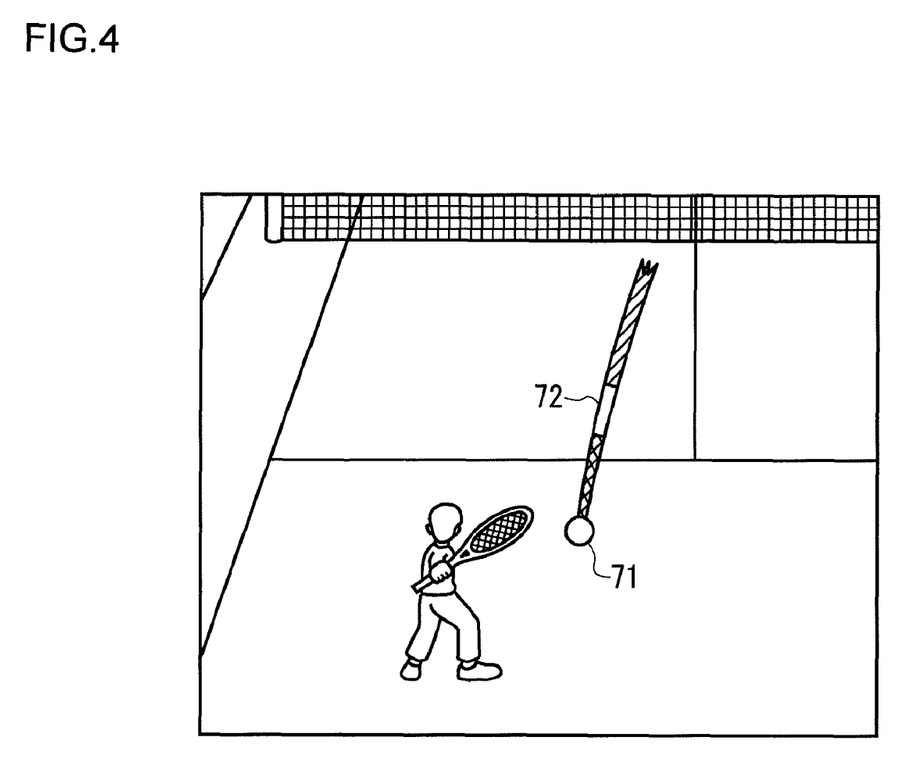
FIG. 4 is a screen view showing a trajectory displayed by a height display control unit.

FIG. 4 is a screen view showing a trajectory displayed by the height display control unit 44. The trajectory 72 is displayed behind a ball 71, and has a color which is dependent on the height of the ball. In FIG. 4, different hatches indicate different display colors. There are some conventional video ball games which indicate the height of the ball with the size of the shadow of the ball and the like. However, this type of indication makes it difficult to identify the height and makes the level of difficulty unnecessarily high for returning a lob. Representing the height by the color of the trajectory allows the user to easily determine the timing for hitting the ball even if the user has not mastered a technique for identifying the height of the ball by the shadow. This prevents the result of the match from depending on a technique not directly related to real tennis, i.e., identifying the height, and can provide a video game which focuses on the intrinsic strategy of tennis. The height display control unit 44 may change the sound of hitting according to the height of the ball when the character hits it.

The shot display control unit 45 controls the presentation of information on the screen which indicates the type of shot used in the stroke by the character so as to identify it. In real tennis, the type of shot is determined by visually noting the stroke form of the opponent and the ball bounce, but it is difficult to represent a subtle difference in the ball bounce on a two-dimension display screen. Accordingly, the shot display control unit 45 displays an effect that indicates the type of shot, near the hitting point or near the ball, when the character hits the ball or when the ball travels after being hit. For example, a figure with the same color and shape as that marked on the selected hit button 26 of the controller 20 is displayed.

Figure 5:
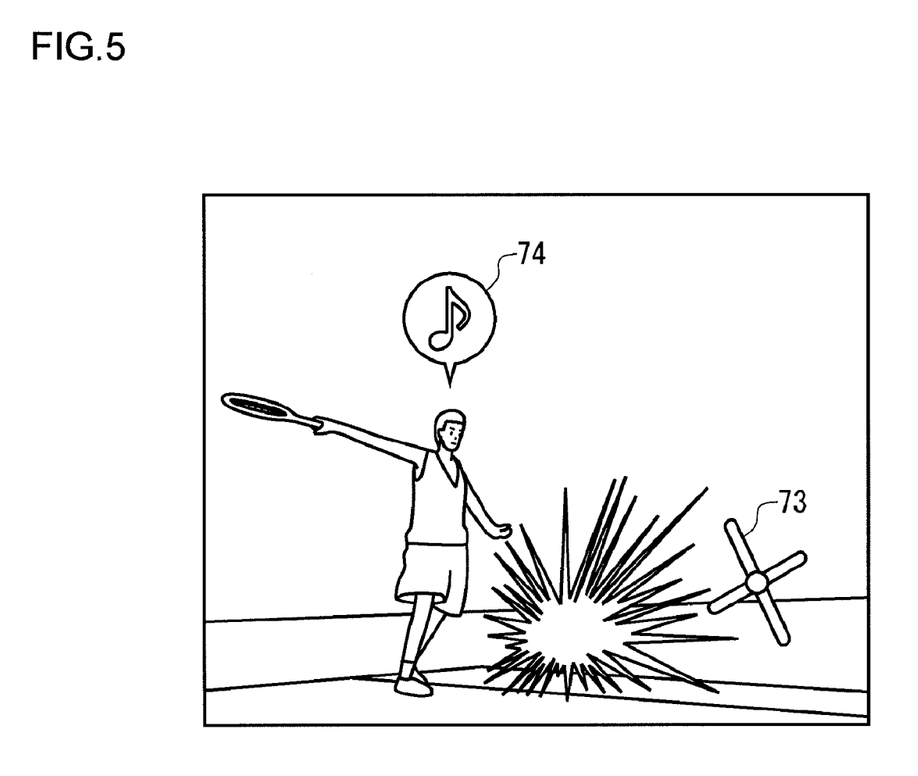
FIG. 5 is a screen view showing a shot type displayed by a shot display control unit.

FIG. 5 is a screen view showing the shot displayed by the shot display control unit 45. When the user makes a top spin shot with the circle button 22, a red circle is displayed near the ball, when the user makes a slice shot with the cross button 23, a blue cross is displayed near the ball, when the user makes a flat shot with the square button 24, a purple square is displayed near the ball, and when the user makes a lob shot with the triangle button 25, a green triangle is displayed near the ball. In this way, the shot display control unit 45 displays the type of shot used in the stroke by displaying information which can identify the button used for an operation of the user's hitting instruction, such as the figure or the letter which is marked on that button. In the example of FIG. 5, a blue cross 73 which indicates a slice shot is displayed near the ball. Thus, the user can determine the type of shot immediately after the opponent hits the ball, and move the character accordingly. Moreover, displaying this visually amusing, showy effect makes it possible to improve the amusement the video game provides. The shot display control unit 45 may change the sound of hitting according to the shot. For example, the quality of the timing of hitting may be represented by the pitch of a sound, and the type of shot may be represented by the length of a sound. The timing may be represented by a sound immediately after hitting, and the type of shot or the height of the ball may be represented by a sound when the ball travels. Note that FIG. 5 shows a symbol 74 which indicates the timing of hitting as well.

The serve control unit 46 controls the execution of serves. The serve control unit 46 makes the character controlled by the user perform a serve when the user presses the hit button 26 twice. When receiving the input of the right or left direction keys 21 before serve, the serve control unit 46 moves the character to the right or left for the serve. When receiving the first input of the hit button 26, the serve control unit 46 makes the character perform the action of tossing a ball. When receiving the second input of the hit button 26, the serve control unit 46 makes the character perform the action of a serve.

The serve control unit 46 determines the power or speed of the ball in a serve according to the type of the hit button 26 hit in the first pressing operation. For example, when the square button 24 is pressed, the power or speed of the ball is increased, and when the cross button 23 is pressed, the power or speed of the ball is decreased. When the triangle button 25 is pressed, an underhand serve is selected. When the circle button 22 is pressed, the power or speed of the ball is selected automatically. When the circle button 22 is pressed, the power or speed of the ball is increased for the first serve, and the power or speed of the ball is decreased for the second serve. If the power or speed of the ball is increased, the serve control unit 46 may increase the amount of shift from the target point when the timing of hitting is shifted, thereby decreasing the accuracy of the serve. Conversely, if the power or speed of the ball is decreased, the serve control unit 46 may decrease the amount of shift, thereby increasing the accuracy of the serve. If a serve with high power is selected, it may allow the user to aim at a position closer to the line than a serve with low power.

The serve control unit 46 determines the type of shot used for the serve according to the type of hit button 26 pressed in the second pressing operation. The shot is a top spin when the circle button 22 is pressed, a slice when the cross button 23 is pressed, flat when the square button 24 is pressed, and a lob when the triangle button 25 is pressed, as when hitting during a rally. When one of the direction keys 21 is pressed in the second pressing operation of the hit button 26, the target of the landing point of the ball is moved in the direction corresponding to the pressed key. The control of the behavior of the hit ball is the same as that described above with regard to the hit control unit 42.

Figure 6:
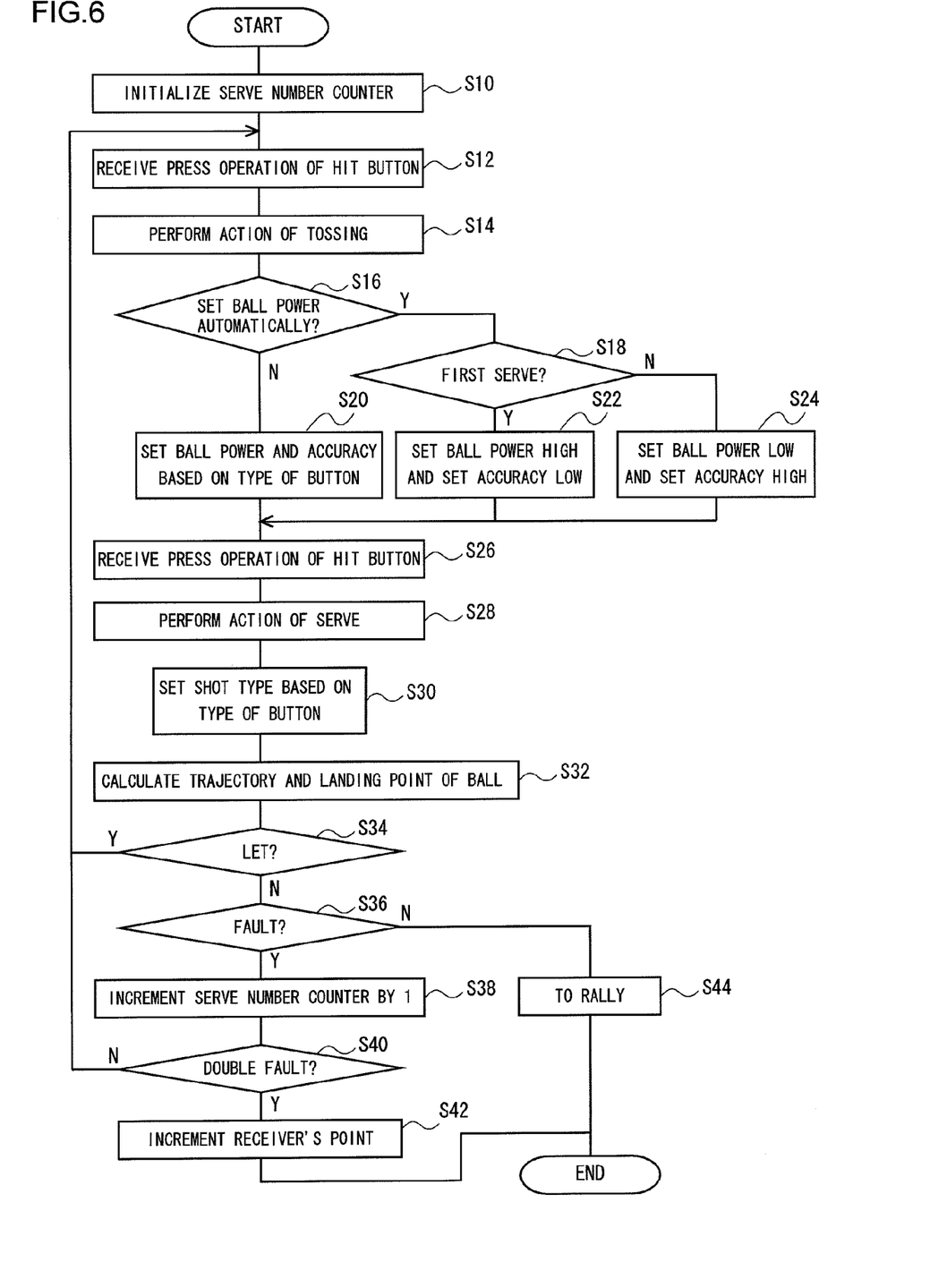
FIG. 6 is a flowchart showing a control procedure of a serve control unit.

FIG. 6 is a flowchart showing a control procedure of the serve control unit 46. The serve control unit 46 initializes the counter, which shows the number of serves, to 1 before the character serves (S10). Then, the serve control unit 46 waits for a user's pressing operation of a hit button 26, and upon receiving the pressing operation of one of the hit buttons 26

(S12), makes the character perform the action of tossing a ball (S14). If the type of the hit button 26 which has been pressed by the user is other than the circle button 22 for automatically setting the ball power (N at S16), the power and accuracy of serve are set according to the type of the button (S20). If the circle button 22 is pressed (Y at S16), the serve number counter is referred to. If this is the first serve (Y at S18) the power is set high and the accuracy is set low (S22), or if it is the second serve (N of S18) the power is set low and the accuracy is set high (S24).

When the second pressing operation of the hit button 26 is received while tossing the ball (S26), the serve control unit 46 makes the character perform the action of a serve (S28). At this time, the type of shot used in the serve is set according to the type of the hit button 26 pressed by the user (S30). Here, the parameters of the power and the accuracy determined at S20, S22, or S24 may be adjusted on the basis of the timing of the second pressing operation of the hit button 26. In addition, the trajectory and landing point of the ball are calculated, and the success or failure of the serve is judged (S32). When the serve is a let (Y of S34), the procedure is returned to S12 for performing the first serve again. When the serve is not a let (N of S34) but a fault (Y of S36), the serve number counter is incremented by one (S38). If the fault is the first (N of S40), the procedure is returned to S12 for performing the second serve. When the serve is a double fault (Y of S40), the receiver's points are incremented and the serve is ended (S42). When the serve is neither a fault nor a let (N of S36), the hit control unit 42 controls processing for a rally (S44).

Thus, even on the first serve, it is possible to reduce the power of the shot and serve with focused accuracy, and conversely, even on the second serve, it is possible to serve with a high-powered shot at the expense of accuracy. This increases the freedom for use of strategy and allows the user to enjoy the game skill involved in serving which forms an important component of competition.

In the examples described above, the speed or power of the ball is determined by the first pressing operation, and the shot is determined by the second pressing operation. However, the opposite may be true or the serve may be performed by three or more press operations. Moreover, the ball speed, ball power, and the type of shot are determined on the basis of the type of the hit button 26 pressed, but the shot and the like may alternatively be determined on the basis of how the button is pressed or on a combination of multiple buttons.

The power control unit 47 increases the parameter which indicates the power of the character when the character is at rest, and controls the speed, power, or accuracy of the ball accordingly so that they are higher than usual when the character hits the ball with this parameter at or over a predetermined value. Moreover, in this circumstance, the user may be able to aim at a position close to the line at which the user cannot usually aim. When the character begins moving, the power control unit 47 may reset this parameter to zero. The power control unit 47 may maintain the parameter at the value which has been accumulated while the character remains within a predetermined distance, for example, within a range of 50 cm, even if the character begins moving. A level may be set according to the value of the parameter which indicates the power, and the speed, power and accuracy of the ball and the like may be determined on the basis of this level.

Figure 7:
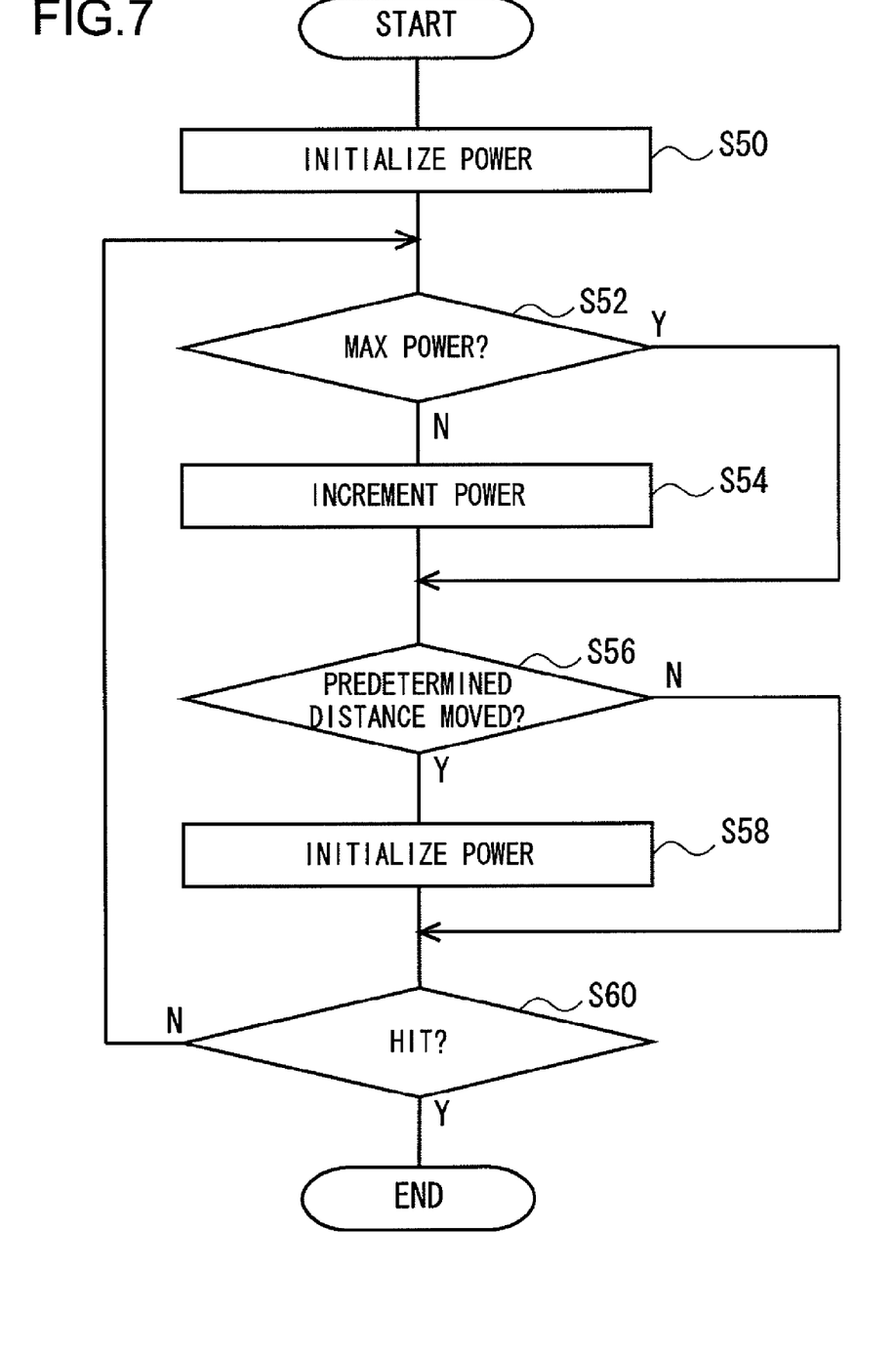
FIG. 7 is a flowchart showing a control procedure of a power control unit.

FIG. 7 is a flowchart showing the control procedure of the power control unit 47. The power control unit 47 initializes the power of the characters to zero after a serve (S50). After that, so long as the power does not reach the maximum value (N at S52), the power is incremented (S54). If the power reaches the maximum value (Y at S52), processing for incrementing the power is skipped so as not to increase the power any higher. The above processing is repeated until the character performs a hitting action (N at S60), so long as the character remains within a predetermined range (N at S56), thereby accumulating power. This loop processing is performed at predetermined time intervals. If the character moves by a predetermined distance or more (Y at S56), the power is initialized (Y at S58). If the character hits the ball (Y at S60), the power accumulated at that time is reflected in the setting of parameters such as the speed, power, and accuracy of the ball.

In this way, the system is configured so that if the user performs a hitting operation after the user estimates the opponent's shot, quickly moves the character to a position suitable for returning the ball, and recovers the character's balance at that position, the speed, power, and accuracy of the ball are improved. This can provide the same effects as in real tennis. Moreover, when the ball falls outside the estimated position, the user can select a stroke without high power after moving the character to the proper target position, or a stroke with high power and with some shift from the proper position, and thereby a new choice in strategy is provided. As a result, the provided video game allows the user to enjoy more intrinsically interesting tennis incorporating strategy and game skill.

In the examples described above, the parameter indicating power is increased depending on the time period for which the character is at rest. However, the parameter may be increased depending on the time period when the user presses a predetermined button. For example, the parameter is increased while the user presses the hit button 26, and the hitting is performed on the basis of the parameter value at the time when the hit button 26 is released.

As described above, in the tennis game according to the present embodiment, rapid determination and quick operation are not important, and reducing the speed of the ball allows the user to take a longer time for deciding on a strategy on the basis of various types of information available. Moreover, clearly presenting information such as shot and ball height allows a video game which focuses on strategy such as returning the ball to a desired target and changing the type of shot.

Described above is an explanation on the basis of the embodiment. The embodiment is only illustrative in nature and it will be obvious to those skilled in the art that variations in constituting elements and processes are possible within the scope of the present invention.

INDUSTRIAL APPLICABILITY

The present invention is usable for game apparatuses.

What is claimed is:

1. A non-transitory computer-readable recoding medium which stores a program which controls a game in which a user-controlled character and an opponent character hit a ball, the program comprising:

a module for determining a shot type and a shot timing when the character hits the ball;

a module for calculating a trajectory of the ball hit based on the shot type and displaying the flying ball on a display screen; and a module for displaying information for specifying the shot type on the display screen, wherein the module for determining the shot type receives an input operation from the user and determines the shot type when the character controlled by the user hits the ball on the basis of a type of a button used for the input operation of a hitting instruction by the user, and in response to the input operation the module is configured to display the information for specifying the shot type on the display screen by displaying a figure or letter marked on the button associated with the shot type on the screen; wherein the module is further configured to display a character on the display screen associated with the shot timing to notify the user whether their timing is slow, fast or just right.

2. A game control method performed by a computer which controls a game in which a user-controlled character and an opponent character hit a ball, comprising:

determining by the computer a shot type and a shot timing when the character hits the ball;

calculating by the computer a trajectory of the ball hit based on the shot type and displaying the flying ball on a display screen; and displaying by the computer information for specifying the shot type on the display screen, wherein said determining the shot type receives an input operation from the user and determines the shot type when the character controlled by the user hits the ball on the basis of a type of a button used for the input operation of a hitting instruction by the user, and said displaying the information for specifying the shot type on the display screen displays a figure or letter marked on the button associated with the shot type on the display screen; wherein the display screen is further configured to display a character on the display screen associated with the shot timing to notify the user whether their timing is slow, fast or just right.

3. A game apparatus which controls a game in which a user-controlled character and an opponent character hit a ball, comprising:

a determining unit which determines a shot type and a shot timing when the character hits the ball;

a calculating unit which calculates a trajectory of the ball hit based on the shot type and displaying the flying ball on a display screen; and a display unit which is configured to display information for specifying the shot type on the display screen, wherein the determining unit receives an input operation from the user and determines the shot type when the character controlled by the user hits the ball on the basis of a type of a button used for the input operation of a hitting instruction by the user, and the display unit displays a figure or letter marked on the button associated with the shot type on the screen; wherein the display unit is further configured to display a character on the display screen associated with the shot timing to notify the user whether their timing is slow, fast or just right.

* * * * *